US012633992B2

(12) United States Patent
Kim

(10) Patent No.: US 12,633,992 B2
(45) Date of Patent: May 19, 2026

(54) METHOD AND APPARATUS FOR ACQUIRING A SYSTEM INFORMATION BASED ON A BEAM GROUP IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 447 days.

(21) Appl. No.: 17/915,951

(22) PCT Filed: Apr. 23, 2021

(86) PCT No.: PCT/KR2021/005174
§ 371 (c)(1),
(2) Date: Sep. 29, 2022

(87) PCT Pub. No.: WO2021/225314
PCT Pub. Date: Nov. 11, 2021

(65) Prior Publication Data
US 2023/0142130 A1 May 11, 2023

(30) Foreign Application Priority Data
May 6, 2020 (KR) ........................ 10-2020-0053809

(51) Int. Cl.
*H04B 7/06* (2006.01)
*H04B 7/08* (2006.01)
(Continued)

(52) U.S. Cl.
CPC ......... *H04B 7/06952* (2023.05); *H04B 7/088* (2013.01); *H04W 16/28* (2013.01); *H04W 84/06* (2013.01)

(58) Field of Classification Search
None
See application file for complete search history.

(56) References Cited
U.S. PATENT DOCUMENTS 10,868,654 B2 * 12/2020 Wang ..................... H04W 48/10
2015/0131750 A1 * 5/2015 Xue ..................... H04B 7/0639
375/267
(Continued)

OTHER PUBLICATIONS

Catt, "Cell Selection and Reselection and Reselection Issue in NTN System," 3GPP TSG-RAN Meeting #106, R2-1905873, May 2019, 5 pages.
(Continued)

*Primary Examiner* — Abdullah Ahmed
*Assistant Examiner* — Ahmed Saifuddin
(74) *Attorney, Agent, or Firm* — LEE, HONG, DEGERMAN, KANG & WAIMEY

(57) ABSTRACT

A method and apparatus for acquiring a system information based on a beam group in a wireless communication system is provided. A wireless device selects a first beam as a serving beam. A wireless device receives, from the first beam of a cell, a system information. A wireless device changes the serving beam from the first beam to a second beam of the cell. A wireless device initiates a system information acquisition procedure for the system information based on determining that the second beam belongs to a different beam group from the first beam.

5 Claims, 12 Drawing Sheets

(51) Int. Cl.
     H04W 16/28      (2009.01)
     H04W 84/06      (2009.01)

(56)                    References Cited

U.S. PATENT DOCUMENTS

| | | | |
|---|---|---|---|
| 2016/0073326 A1 | 3/2016 | Vannithamby et al. | |
| 2018/0359682 A1* | 12/2018 | Nader | H04L 12/189 |
| 2019/0190676 A1 | 6/2019 | Wang et al. | |
| 2019/0289639 A1* | 9/2019 | Frenger | H04W 72/046 |
| 2020/0084700 A1* | 3/2020 | Wei | H04W 48/10 |
| 2021/0120581 A1* | 4/2021 | Kim | H04W 76/27 |
| 2021/0258838 A1* | 8/2021 | Ma | H04W 48/12 |
| 2023/0148282 A1* | 5/2023 | Marinier | H04W 72/0446 |
| | | | 370/329 |
| 2023/0284264 A1* | 9/2023 | Kim | H04L 1/0003 |
| | | | 370/329 |
| 2025/0008399 A1* | 1/2025 | Xu | H04W 36/0061 |

OTHER PUBLICATIONS

3rd Generation Partnership Project (3GPP), "Technical Specification Group Radio Access Network; NR; Radio Resource Control (RRC) protocol specification (Release 16)," Section 5.2 of 3GPP TS 38.331 V16.0.0, Mar. 2020, 835 pages.
PCT International Application No. PCT/KR2021/005174, International Search Report dated Aug. 4, 2021, 2 pages.

* cited by examiner

FIG. 1

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 10

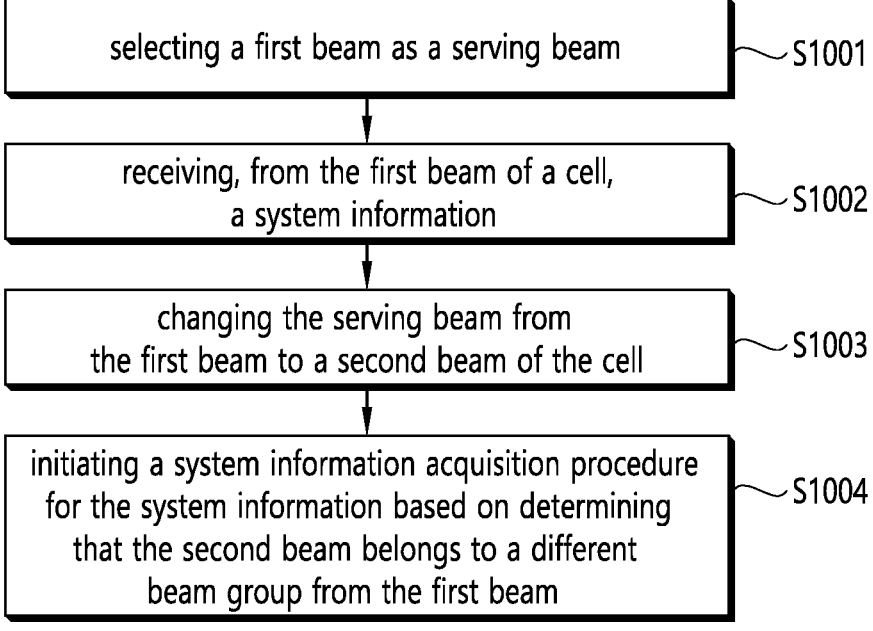

selecting a first beam as a serving beam  ⌐~S1001 receiving, from the first beam of a cell,
a system information  ⌐~S1002 changing the serving beam from
the first beam to a second beam of the cell  ⌐~S1003 initiating a system information acquisition procedure
for the system information based on determining
that the second beam belongs to a different
beam group from the first beam  ⌐~S1004 receiving the beam group configuration
from the serving cell    S1201 re-selecting the serving beam    S1202 performing the system information
acquisition procedure    S1203

METHOD AND APPARATUS FOR ACQUIRING A SYSTEM INFORMATION BASED ON A BEAM GROUP IN A WIRELESS COMMUNICATION SYSTEM

CROSS-REFERENCE TO RELATED APPLICATIONS

This application is the National Stage filing under 35 U.S.C. 371 of International Application No. PCT/KR2021/ 005174, filed on Apr. 23, 2021, which claims the benefit of earlier filing date and right of priority to Korean Application No. 10-2020-0053809, filed May 6, 2020, the contents of which are all incorporated by reference herein in their entirety.

BACKGROUND

Technical Field

The present disclosure relates to a method and apparatus for acquiring a system information based on a beam group in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Thanks to the wide service coverage capabilities and reduced vulnerability of space/airborne vehicles to physical attacks and natural disasters, non-terrestrial networks (NTN) are expected to:

foster the roll out of 5G service in un-served areas that cannot be covered by terrestrial 5G network (isolated/ remote areas, on board aircrafts or vessels) and under-served areas (e.g., sub-urban/rural areas) to upgrade the performance of limited terrestrial networks in cost effective manner, reinforce the 5G service reliability by providing service continuity for machine-to-machine (M2M)/Internet-of-things (IoT) devices or for passengers on board moving platforms (e.g., passenger vehicles-aircraft, ships, high speed trains, bus) or ensuring service availability anywhere especially for critical communications, future railway/maritime/aeronautical communications, and to enable 5G network scalability by providing efficient multicast/broadcast resources for data delivery towards the network edges or even user terminal.

SUMMARY

Technical Objects

The configuration provided via the system information is common to all wireless devices camping on the same cell. The network cannot provide different system information to different wireless devices in the same cell though the coverage of the cell is very wide (for example, in case of non-terrestrial network (NTN) cell). It may be very useful to provide different system information to different wireless devices in the same cell depending on the location of the wireless devices.

If all beams that belong to a same cell broadcast the same system information, a wireless device may could re-acquire the system information within the cell, even though the serving beam is changed.

Therefore, studies for acquiring a system information based on a beam group in a wireless communication system are required.

Technical Solutions

In an aspect, a method performed by a wireless device in a wireless communication system is provided. A wireless device selects a first beam as a serving beam. A wireless device receives, from the first beam of a cell, a system information. A wireless device changes the serving beam from the first beam to a second beam of the cell. A wireless device initiates a system information acquisition procedure for the system information based on determining that the second beam belongs to a different beam group from the first beam.

In another aspect, an apparatus for implementing the above method is provided.

Technical Effects

The present disclosure can have various advantageous effects.

According to some embodiments of the present disclosure, a wireless device could efficiently acquire a beam group specific a system information.

For example, a wireless device could apply the optimized system information depending on a location of the wireless device.

A wireless device could minimize the power consumption for acquiring the system information and requesting SI transmission by acquiring and requesting the system information based on the beam group.

According to some embodiments of the present disclosure, a wireless communication system could efficiently provide a beam group specific a system information to wireless devices in a single cell.

For example, a network could provide different system information to different wireless devices in IDLE state and/or INACTIVE state, which is optimized for the location of the wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 10 shows an example of a method for acquiring a system information based on a beam group in a wireless communication system, according to some embodiments of the present disclosure.

DETAILED DESCRIPTION

Figure 2:
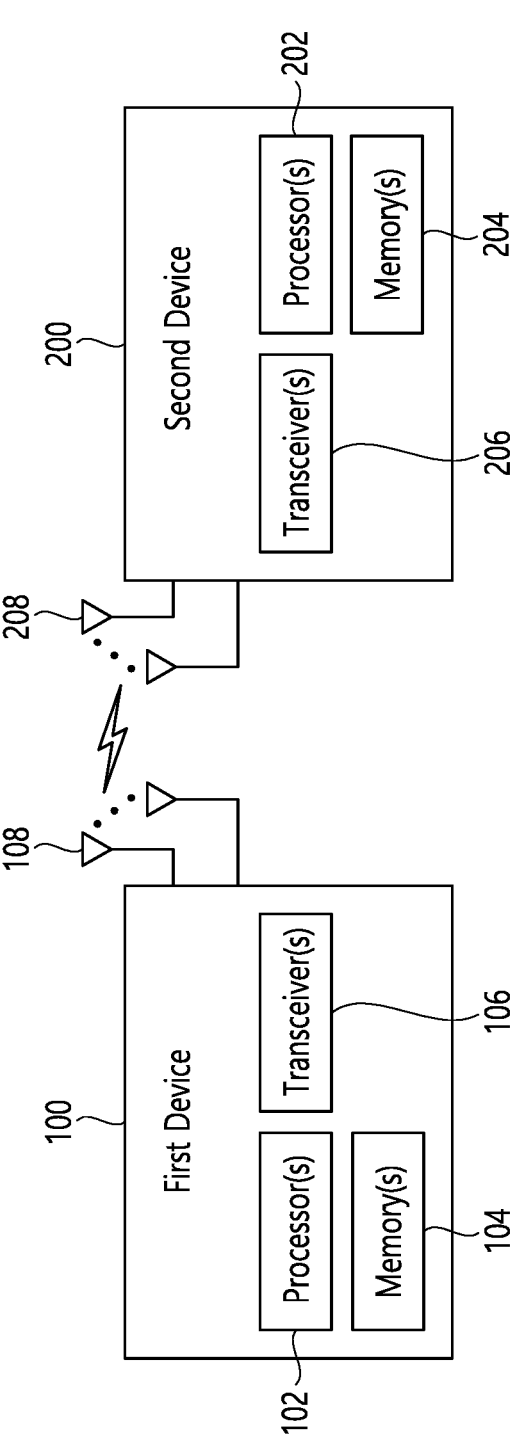
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
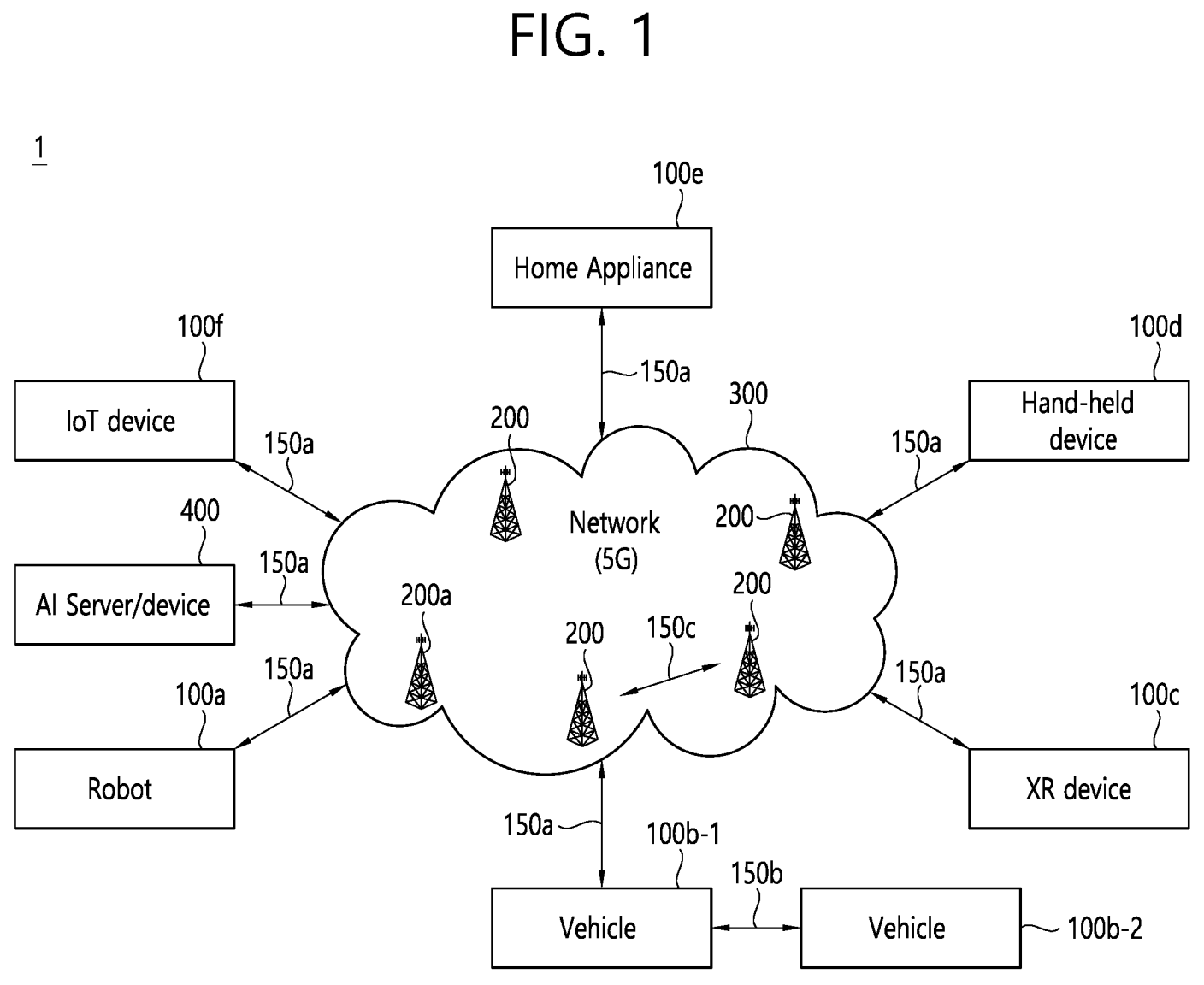

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration.

For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
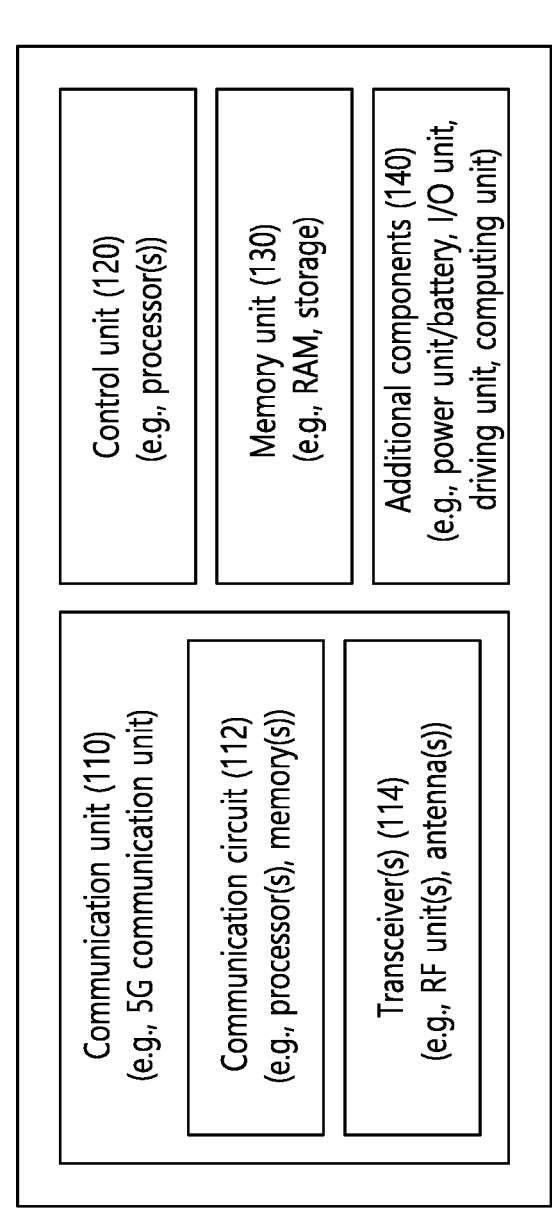
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
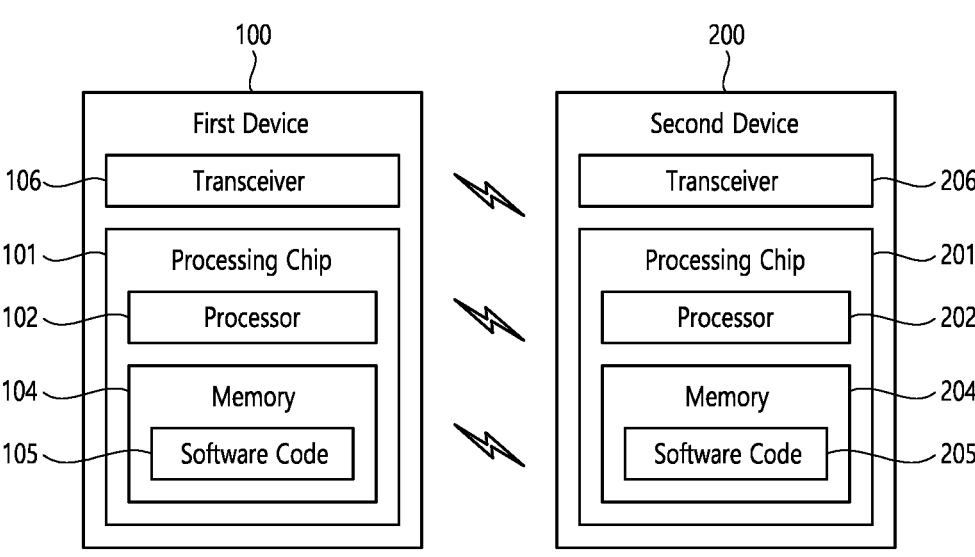
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
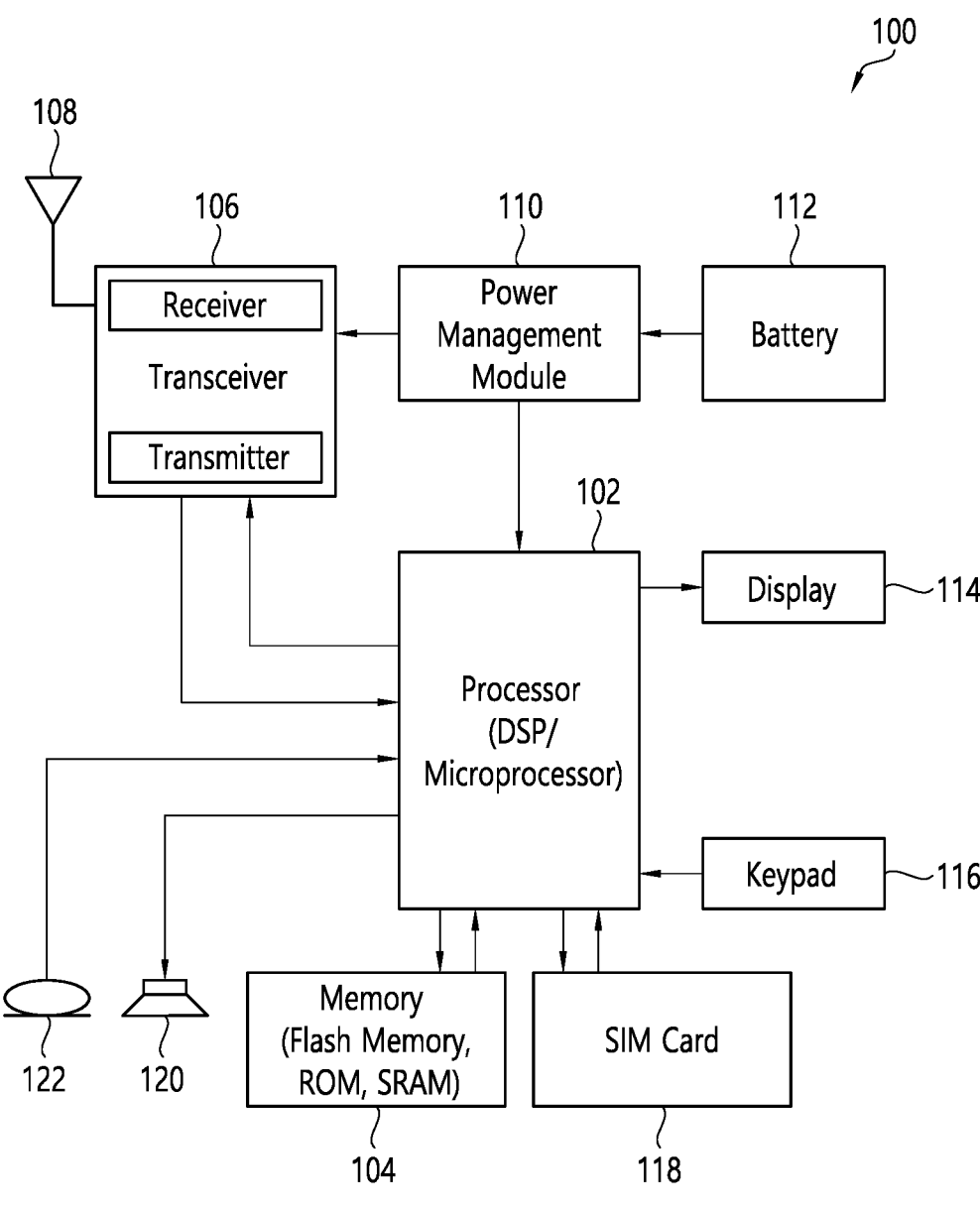
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON' series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
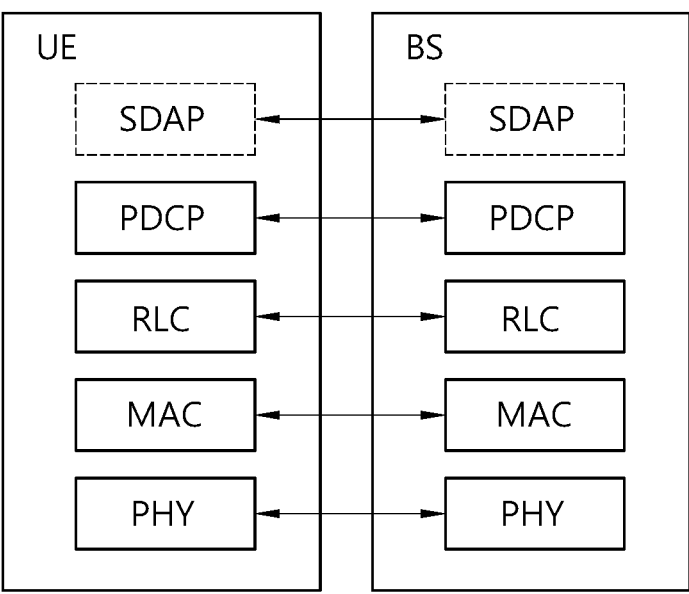
FIGS. 6 and 7 show an example of protocol stacks in a 3GPP based wireless communication system to which implementations of the present disclosure is applied.
Figure 7:
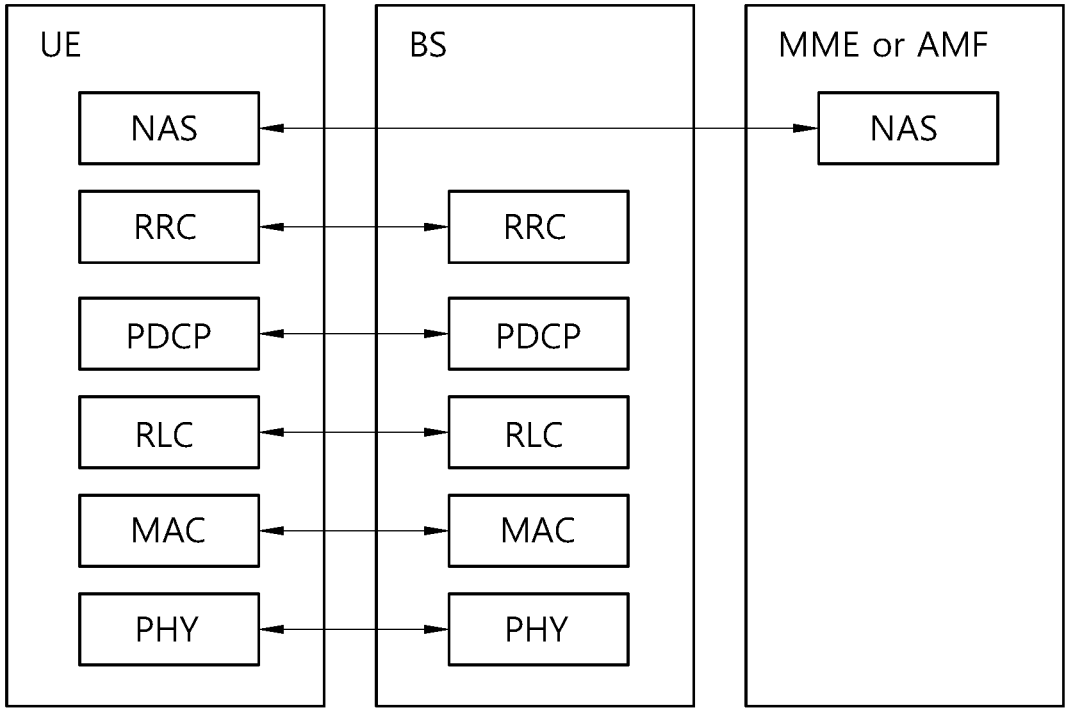

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and anon-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
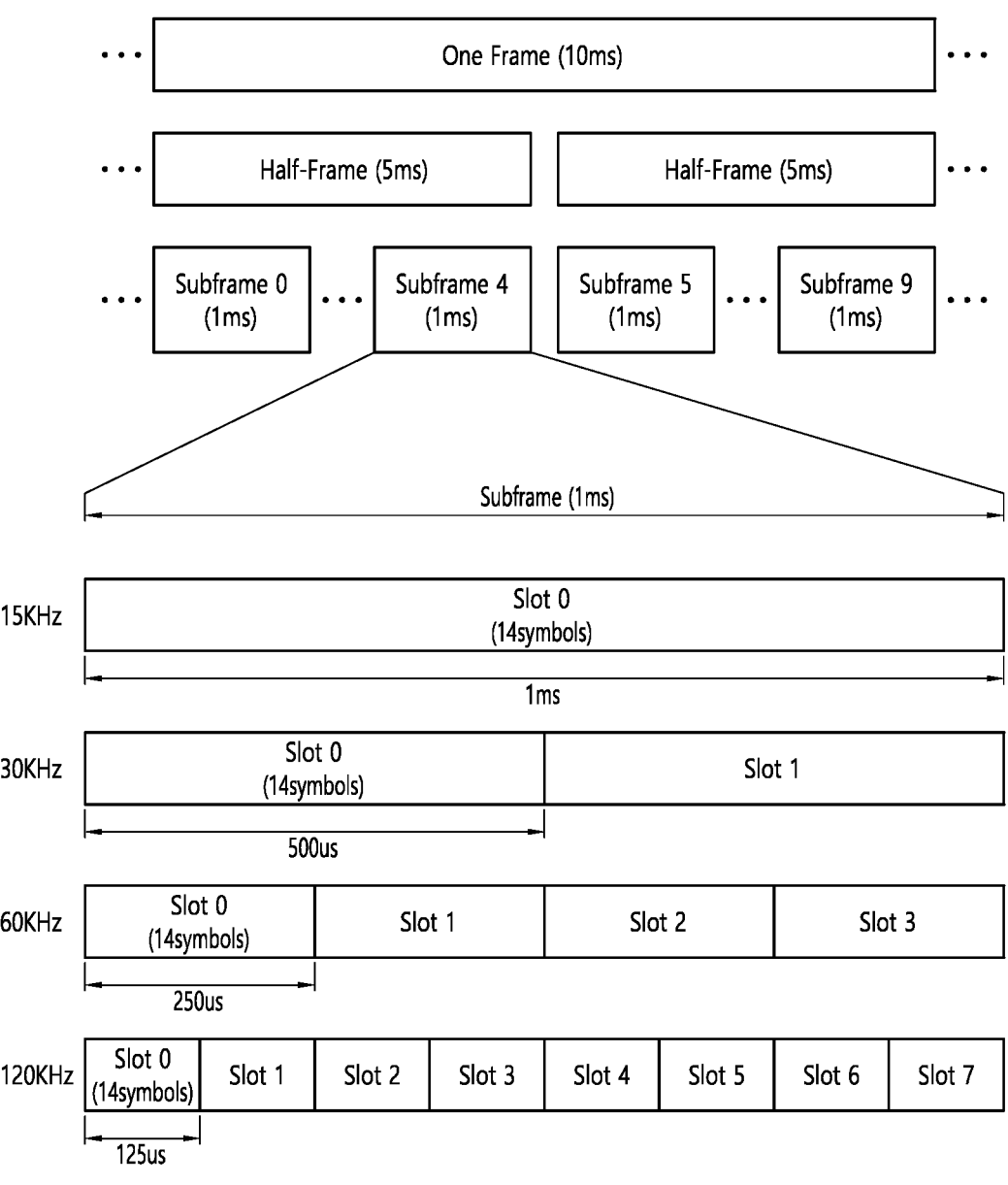
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^{\mu}*15$ kHz.

Table 1 shows the number of OFDM symbols per slot $N^{slot}_{symb}$, the number of slots per frame $N^{frame,\mu}_{slot}$, and the number of slots per subframe $N^{subframe,\mu}_{slot}$ for the normal CP, according to the subcarrier spacing $\Delta f=2^{\mu}*15$ kHz.

TABLE 1

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,\mu}_{slot}$, and the number of slots per subframe $N^{subframe,\mu}_{slot}$ for the extended CP, according to the subcarrier spacing $\Delta f=2^{\mu}*15$ kHz.

TABLE 2

| u | $N^{slot}_{symb}$ | $N^{frame,\,u}_{slot}$ | $N^{subframe,\,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,\mu}_{grid,x}*N^{RB}_{sc}$ subcarriers and $N^{subframe,\mu}_{symb}$ OFDM symbols is defined, starting at common resource block (CRB) $N^{start,\mu}_{grid}$ indicated by higher-layer signaling (e.g., RRC signaling), where $N^{size,\mu}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,\mu}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below.

That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

Figure 9:
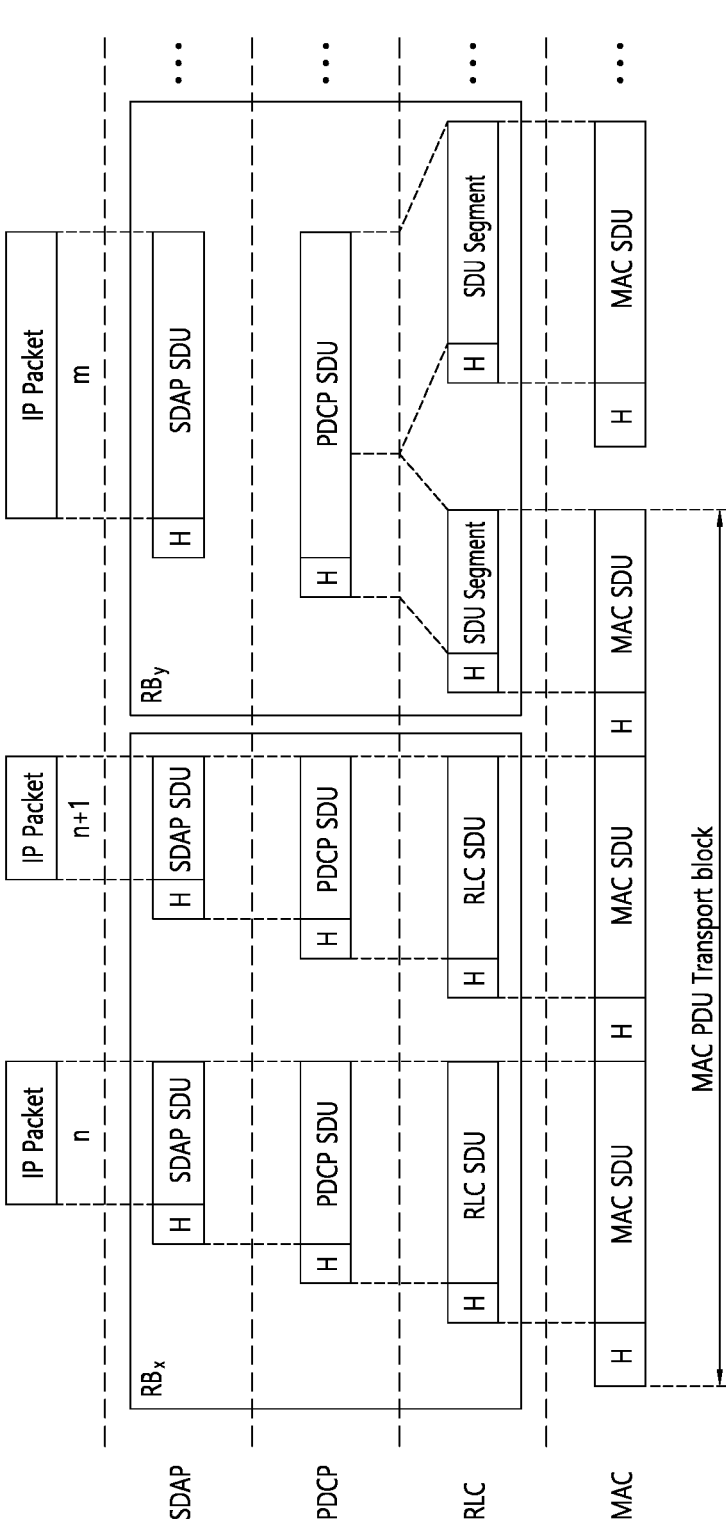
FIG. 9 shows a data flow example in the 3GPP NR system to which implementations of the present disclosure is applied.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG. FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, System information are described. Section 5.2 of 3GPP TS 38.331 v16.0.0 may be referred.

System Information (SI) is divided into the MIB and a number of SIBs and posSIBs where:

the MIB is always transmitted on the BCH with a periodicity of 80 ms and repetitions made within 80 ms and it includes parameters that are needed to acquire SIB1 from the cell. The first transmission of the MIB is scheduled in subframes and repetitions are scheduled according to the period of SSB;

the SIB1 is transmitted on the DL-SCH with a periodicity of 160 ms and variable transmission repetition period-icity within 160 ms. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period. SIB1 includes information regarding the availability and scheduling (e.g. mapping of SIBs to SI message, peri-odicity, SI-window size) of other SIBs with an indica-tion whether one or more SIBs are only provided on-demand and, in that case, the configuration needed by the UE to perform the SI request. SIB1 is cell-specific SIB;

SIBs other than SIB1 and posSIBs are carried in System-Information (SI) messages, which are transmitted on the DL-SCH. Only SIBs or posSIBs having the same periodicity can be mapped to the same SI message. SIBs and posSIBs are mapped to the different SI messages. Each SI message is transmitted within peri-odically occurring time domain windows (referred to as SI-windows with same length for all SI messages). Each SI message is associated with an SI-window and the SI-windows of different SI messages do not over-lap. That is, within one SI-window only the corre-sponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID;

The mapping of SIBs to SI messages is configured in schedulingInfoList, while the mapping of posSIBs to SI messages is configured in posSI-SchedulingInfoList;

For a UE in RRC_CONNECTED, the network can pro-vide system information through dedicated signalling using the RRCReconfiguration message, e.g. if the UE has an active BWP with no common search space configured to monitor system information or paging.

For PSCell and SCells, the network provides the required SI by dedicated signalling, i.e. within an RRCRecon-figuration message. Nevertheless, the UE shall acquire MIB of the PSCell to get SFN timing of the SCG (which may be different from MCG). Upon change of relevant SI for SCell, the network releases and adds the concerned SCell. For PSCell, the required SI can only be changed with Reconfiguration with Sync.

The physical layer imposes a limit to the maximum size a SIB can take. The maximum SIB1 or SI message size is 2976 bits.

System information acquisition is described.

The UE applies the SI acquisition procedure to acquire the AS, NAS- and positioning assistance data information. The procedure applies to UEs in RRC_IDLE, in RRC_INAC-TIVE and in RRC_CONNECTED.

The UE in RRC_IDLE and RRC_INACTIVE shall ensure having a valid version of (at least) the MIB, SIB1 through SIB4, SIB5 (if the UE supports E-UTRA) and SIB11 (if the UE is configured for idle/inactive measurements).

Procedure related to SIB validity and need to (re)-acquire SIB is described.

The UE shall apply the SI acquisition procedure upon cell selection (e.g. upon power on), cell-reselection, return from out of coverage, after reconfiguration with sync completion, after entering the network from another RAT, upon receiving an indication that the system information has changed, upon receiving a PWS notification, upon receiving a positioning request from upper layers; and whenever the UE does not have a valid version of a stored SIB.

When the UE acquires a MIB or a SIB1 or an SI message in a serving cell, and if the UE stores the acquired SIB, then the UE shall store the associated areaScope, if present, the first PLMN-Identity in the PLMN-IdentityInfoList for non-NPN-only cells, the first NPN-Identity (SNPN identity in case of SNPN, or PNI-NPN identity in case of PNI-NPN) in the NPN-IdentityInfoList for NPN-only cells, the cellIden-tity, the systemInformationAreaID, if present, and the valu-eTag, if present, as indicated in the si-SchedulingInfo for the SIB. The UE may use a valid stored version of the SI except MIB, SIB1, SIB6, SIB7 or SIB8 e.g. after cell re-selection, upon return from out of coverage or after the reception of SI change indication. The value tag for posSIB is optionally provided in LPP signalling.

The storage and management of the stored SIBs in addition to the SIBs valid for the current serving cell is left to UE implementation.

The UE shall:

1> delete any stored version of a SIB after 3 hours from the moment it was successfully confirmed as valid;

1> for each stored version of a SIB:

2> if the areaScope is associated and its value for the stored version of the SIB is the same as the value received in the si-SchedulingInfo for that SIB from the serving cell:

3> if the cell is non-NPN-only cell and the first PLMN-Identity included in the PLMN-IdentityInfoList, the system-InformationAreaID and the valueTag that are included in the si-SchedulingInfo for the SIB received from the serving cell are identical to the PLMN-Identity, the systemInformation-AreaID and the valueTag associated with the stored version of that SIB:

4> consider the stored SIB as valid for the cell;

3> if the cell is an NPN-only cell and the first NPN-Identity included in the NPN-IdentityInfoList, the system-InformationAreaID and the valueTag that are included in the si-SchedulingInfo for the SIB received from the serving cell are identical to the NPN-Identity, the systemInformation-AreaID and the valueTag associated with the stored version of that SIB:

4> consider the stored SIB as valid for the cell;

2> if the areaScope is not present for the stored version of the SIB and the areaScope value is not included in the si-SchedulingInfo for that SIB from the serving cell:

3> if the cell is non-NPN-only cell and the first PLMN-Identity in the PLMN-IdentityInfoList, the cellIdentity and valueTag that are included in the si-SchedulingInfo for the SIB received from the serving cell are identical to the PLMN-Identity, the cellIdentity and the valueTag associated with the stored version of that SIB:

4> consider the stored SIB as valid for the cell;

3> if the cell is an NPN-only cell and the first NPN-Identity in the NPN-IdentityInfoList, the cellIdentity and valueTag that are included in the si-SchedulingInfo for the SIB received from the serving cell are identical to the NPN-Identity, the cellIdentity and the valueTag associated with the stored version of that SIB:

4> consider the stored SIB as valid for the cell;

Acquisition of System Information is described. In particular, acquisition of MIB and SIB1 is described.

The UE shall:

1> apply the specified BCCH configuration;

1> if the UE is in RRC IDLE or in RRC_INACTIVE; or

1> if the UE is in RRC_CONNECTED while T311 is running:

2> acquire the MIB;

1> if the UE is in RRC_CONNECTED with an active BWP with common search space configured by searchSpaceSIB1 and pagingSearchSpace and has received an indication about change of system information; or 1> if the UE is in RRC_CONNECTED with an active BWP with common search space configured by searchSpaceSIB1 and pagingSearchSpace and the UE has not stored a valid version of a SIB of one or several required SIB(s) and, UE has not acquired SIB1 in current modification period; or 1> if the UE is in RRC IDLE or in RRC_INACTIVE; or 1> if the UE is in RRC_CONNECTED while T311 is running:

2> if ssb-SubcarrierOffset indicates SIB1 is transmitted in the cell and if SIB1 acquisition is required for the UE:

3> acquire the SIB1;

The UE in RRC_CONNECTED is only required to acquire broadcasted SIB1 if the UE can acquire it without disrupting unicast data reception, i.e. the broadcast and unicast beams are quasi co-located.

Acquisition of an SI message is described.

For SI message acquisition PDCCH monitoring occasion(s) are determined according to searchSpaceOtherSystemInformation. If searchSpaceOtherSystemInformation is set to zero, PDCCH monitoring occasions for SI message reception in SI-window are same as PDCCH monitoring occasions for SIB1. If searchSpaceOtherSystemInformation is not set to zero, PDCCH monitoring occasions for SI message are determined based on search space indicated by searchSpaceOtherSystemInformation. PDCCH monitoring occasions for SI message which are not overlapping with UL symbols (determined according to tdd-UL-DL-ConfigurationCommon) are sequentially numbered from one in the SI window. The $[x \times N+K]^{th}$ PDCCH monitoring occasion (s) for SI message in SI-window corresponds to the $K^{th}$ transmitted SSB, where $x=0, 1, \ldots X-1$, $K=1, 2, \ldots N$, N is the number of actual transmitted SSBs determined according to ssb-PositionsInBurst in SIB1 and X is equal to CEIL(number of PDCCH monitoring occasions in SI-window/N). The actual transmitted SSBs are sequentially numbered from one in ascending order of their SSB indexes. The UE assumes that, in the SI window, PDCCH for an SI message is transmitted in at least one PDCCH monitoring occasion corresponding to each transmitted SSB and thus the selection of SSB for the reception SI messages is up to UE implementation.

When acquiring an SI message, the UE shall:

1> determine the start of the SI-window for the concerned SI message as follows:

2> if the concerned SI message is configured in the schedulingInfoList:

3> for the concerned SI message, determine the number n which corresponds to the order of entry in the list of SI messages configured by schedulingInfoList in si-SchedulingInfo in SIB1;

3> determine the integer value $x=(n-1) \times w$, where w is the si-WindowLength;

3> the SI-window starts at the slot #a, where $a=x \bmod N$, in the radio frame for which SFN mod T=FLOOR(x/N), where T is the si-Periodicity of the concerned SI message and N is the number of slots in a radio frame;

2> else if the concerned SI message is configured in the posSI-SchedulingInfoList and offsetToSI-Used is not configured:

3> create a concatented list of SI messages by appending the posSI-SchedulingInfoList in SIB1 to schedulingInfoList in si-SchedulingInfo in SIB1

3> for the concerned SI message, determine the number n which corresponds to the order of entry in the concatenated list;

3> determine the integer value $x=(n-1) \times w$, where w is the si-WindowLength;

3> the SI-window starts at the slot #a, where $a=x \bmod N$, in the radio frame for which SFN mod T=FLOOR(x/N), where T is the si-Periodicity of the concerned SI message and N is the number of slots in a radio frame;

2> else if the concerned SI message is configured by the posSI-SchedulingInfoList and offsetToSI-Used is configured:

3> determine the number m which corresponds to the number of SI messages with an associated si-Periodicity of 8 radio frames (80 ms), configured by schedulingInfoList in SystemInformationBlockType1;

3> for the concerned SI message, determine the number n which corresponds to the order of entry in the list of SI messages configured by posSI-SchedulingInfoList in SIB1;

3> determine the integer value $x=m \times w+(n-1) \times w$, where w is the si-WindowLength 3> the SI-window starts at the slot #a, where $a=x \bmod N$, in the radio frame for which SFN mod T=FLOOR(x/N), where T is the si-Periodicity of the concerned SI message and N is the number of slots in a radio frame;

1> receive the PDCCH containing the scheduling RNTI, i.e. SI-RNTI in the PDCCH monitoring occasion(s) for SI message acquisition, from the start of the SI-window and continue until the end of the SI-window whose absolute length in time is given by si-WindowLength, or until the SI message was received;

1> if the SI message was not received by the end of the SI-window, repeat reception at the next SI-window occasion for the concerned SI message in the current modification period;

The UE is only required to acquire broadcasted SI message if the UE can acquire it without disrupting unicast data reception, i.e. the broadcast and unicast beams are quasi co-located.

The UE is not required to monitor PDCCH monitoring occasion(s) corresponding to each transmitted SSB in SI-window.

If the concerned SI message was not received in the current modification period, handling of SI message acquisition is left to UE implementation.

1> perform the actions for the acquired SI message.

Request for on demand system information is described.

The UE shall:

1> if SIB1 includes si-SchedulingInfo containing si-RequestConfigSUL and criteria to select supplementary uplink:

2> trigger the lower layer to initiate the Random Access procedure on supplementary uplink using the PRACH preamble(s) and PRACH resource(s) in si-RequestConfigSUL corresponding to the SI message(s) that the UE requires to operate within the cell, and for which si-BroadcastStatus is set to notBroadcasting;

2> if acknowledgement for SI request is received from lower layers:

3> acquire the requested SI message(s) immediately;

1> else if SIB1 includes si-SchedulingInfo containing si-RequestConfig and criteria to select normal uplink:

2> trigger the lower layer to initiate the random access procedure on normal uplink using the PRACH preamble(s) and PRACH resource(s) in si-RequestConfig corresponding to the SI message(s) that the UE requires to operate within the cell, and for which si-BroadcastStatus is set to notBroadcasting;

2> if acknowledgement for SI request is received from lower layers:

3> acquire the requested SI message(s) immediately;

1> else:

2> apply the default L1 parameter values as specified in corresponding physical layer specifications except for the parameters for which values are provided in SIB1;

2> apply the default MAC Cell Group configuration;

2> apply the timeAlignmentTimerCommon included in SIB1;

2> apply the CCCH configuration;

2> initiate transmission of the RRCSystemInfoRequest message;

2> if acknowledgement for RRCSystemInfoRequest message is received from lower layers:

3> acquire the requested SI message(s) immediately;

1> if cell reselection occurs while waiting for the acknowledgment for SI request from lower layers:

2> reset MAC;

2> if SI request is based on RRCSystemInfoRequest message:

3> release RLC entity for SRB0.

NOTE: After RACH failure for SI request it is up to UE implementation when to retry the SI request.

Actions related to transmission of RRCSystemInfoRequest message is described.

The UE shall set the contents of RRCSystemInfoRequest message as follows:

1> set the requested-SI-List to indicate the SI message(s) that the UE requires to operate within the cell, and for which si-BroadcastStatus is set to notBroadcasting.

The UE shall submit the RRCSystemInfoRequest message to lower layers for transmission.

Request for on demand system information in RRC_CONNECTED is described.

The UE shall:

1> if the UE is in RRC_CONNECTED with an active BWP not configured with common search and the UE has not stored a valid version of a SIB of one or several required SIB(s):

2> for the SI message(s) that, according to the si-SchedulingInfo in the stored SIB1, contain at least one required SIB:

3> initiate transmission of the DedicatedSIBRequest message;

3> if the UE has an active BWP with common search space configured:

4> acquire the requested SI message(s) corresponding to the requested SIB(s).

1> else if the UE is in RRC_CONNECTED with an active BWP configured with common search space and the UE has not stored a valid version of a SIB of one or several required SIB(s):

2> for the SI message(s) that, according to the si-SchedulingInfo in the stored SIB1, contain at least one required SIB and for which si-BroadcastStatus is set to Broadcasting:

3> acquire the SI message(s);

2> for the SI message(s) that, according to the si-SchedulingInfo in the stored SIB1, contain at least one required SIB and for which si-BroadcastStatus is set to notBroadcasting:

3> initiate transmission of the DedicatedSIBRequest message;

3> if the UE has an active BWP with common search space configured:

4> acquire the requested SI message(s) corresponding to the requested SIB(s).

Actions related to transmission of DedicatedSIBRequest message

The UE shall set the contents of DedicatedSIBRequest message as follows:

1> set the onDemandSIB-RequestList to indicate the requested SIB(s).

The UE shall submit the DedicatedSIBRequest message to lower layers for transmission.

Procedure related to essential system information missing is described.

The UE shall:

1> if in RRC_IDLE or in RRC_INACTIVE or in RRC_CONNECTED while T311 is running:

2> if the UE is unable to acquire the MIB:

3> consider the cell as barred; and

3> perform barring as if intraFreqReselection is set to allowed;

2> else if the UE is unable to acquire the SIB1:

3> consider the cell as barred.

3> if the cell operates in licensed spectrum and intraFreqReselection in MIB is set to notAllowed:

4> consider cell re-selection to other cells on the same frequency as the barred cell as not allowed.

3> else:

4> consider cell re-selection to other cells on the same frequency as the barred cell as allowed.

Meanwhile, the configuration provided via the system information is common to all UEs camping on the same cell. The network cannot provide different system information to different UEs in the same cell though the coverage of the cell is very wide (for example, in case of non-terrestrial network (NTN) cell). It may be very useful to provide different system information to different UEs in the same cell depending on the location of the UEs.

If all beams that belong to a same cell broadcast the same system information, a wireless device could not re-acquire the system information within the cell, even though the serving beam is changed.

Therefore, studies for acquiring a system information based on a beam group in a wireless communication system are required.

Hereinafter, a method for acquiring a system information based on a beam group in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

FIG. 10 shows an example of a method for acquiring a system information based on a beam group in a wireless communication system, according to some embodiments of the present disclosure.

In particular, FIG. 10 shows an example of a method performed by a wireless device.

In step S1001, a wireless device may select a first beam as a serving beam.

According to some embodiments of the present disclosure, a wireless device may receive, from the cell, a beam group configuration including a mapping information between beams and beam groups of the cell.

For example, the wireless device may receive the beam group configuration before selecting the first beam as the serving beam. For example, the wireless device may receive, from the first beam, the beam group configuration after selecting the first beam as the serving beam.

In step S1002, a wireless device may receive, from the first beam of a cell, a system information.

In step S1003, a wireless device may change the serving beam from the first beam to a second beam of the cell.

For example, the wireless device may check whether the second beam belongs to a different beam group from the first beam, upon changing the serving beam from the first beam to a second beam of the cell.

In step S1004, a wireless device may initiate a system information acquisition procedure for the system information based on determining that the second beam belongs to a different beam group from the first beam.

For example, in the system information acquisition procedure, a wireless device may receive, from the second beam of the cell, a new system information to replace the system information received from the first beam.

According to some embodiments of the present disclosure, a wireless device may identify a beam group of the first beam and/or the second beam based on an index of a reference signal.

For example, a wireless device may identify a specific beam by the index of the reference signal. The wireless device may use the beam group configuration to identify a beam group including the specific beam. For example, the wireless device may identify the beam group of the beam based on the mapping information included in the beam group configuration.

For example, the reference signal may include (1) synchronization signals (SS) and/or physical broadcast channel (PBCH block, and/or (2) Channel State Information Reference Signal (CSI-RS).

According to some embodiments of the present disclosure, the system information may include a cell specific system information and/or a beam group specific system information.

For example, the wireless device may perform the system information acquisition procedure, based on that the system information includes the beam group specific system information.

In other words, the wireless device may not initiate the system information acquisition procedure, based on that the system information does not includes the beam group specific system information.

For example, in the system information acquisition procedure, a wireless device may receive only the beam group specific system information.

For example, in the system information acquisition procedure, a wireless device may skip to receive the cell specific system information.

According to some embodiments of the present disclosure, in the system information acquisition procedure, a wireless device may perform a system information request procedure.

For example, a wireless device may perform a system information request procedure, based on that that a new system information, to replace the system information received from the first beam, is not broadcasted.

For example, a wireless device may perform a system information request procedure for a beam group specific system information, based on that the beam group specific system information is not broadcasted.

For example, a wireless device may receive, from the second beam of the cell, the new system information or the beam group specific system information in response to the system information request procedure.

According to some embodiments of the present disclosure, a beam group specific system information for a beam group could be valid for another beam group.

For example, in the system information acquisition procedure, a wireless device may receive, from the second beam, a System Information Block type 1 (SIB1) to receive a new system information to replace the system information received from the first beam, upon initiating the system information acquisition procedure.

A wireless device may check whether a value tag for the new system information included in the SIB1 is identical to a value tag associated with the system information received from the first beam.

For example, in the system information acquisition procedure, a wireless device may receive the new system information, based on determining that the valued tag for the new system information included in the SIB 1 is different from the value tag associated with the system information received from the first beam.

For other example, in the system information acquisition procedure, a wireless device may skip to receive the new system information, based on determining that the valued tag for the new system information included in the SIB1 is identical from the value tag associated with the system information received from the first beam.

In this case, a wireless device may consider that the system information received from the first beam is valid for a beam group including the second beam.

According to some embodiments of the present disclosure, the cell may include a non-terrestrial network (NTN) cell. For example the cell may have a wide size.

For example, there are a first beam group and a second beam group in a cell. The first beam may be included in a first beam group, and the second beam may be included in a second beam group.

For example, the first beam group and the second beam group may be provided in different regions of the cell. That is, a first wireless device receiving the first beam and a second wireless device receiving the second beam may be located at different region.

According to some embodiments of the present disclosure, a wireless device may select a first beam as a serving beam, at a first location in a cell. The wireless device may receive a first system information from the first beam of the cell. For example, the wireless device may receive the first system information at the first location. For example, the first system information includes a first access barring configuration with a first threshold.

The wireless device may move to a second location in the cell. For example, the wireless device may reselect a second beam as a serving beam at the second location. For example, the wireless device may change the serving beam from the first beam to the second beam. For example, the wireless device may receive the second system information from the second beam, for example, at the second location. For example, the second system information may include a second access barring configuration with a second threshold, which is different from the first threshold.

For example, the wireless device could access the cell, at the first location, based on the first access barring configuration. However, the wireless device could not access the cell, at the second location, based on the second access barring configuration.

For other example, the wireless device could not access the cell, at the first location, based on the first access barring configuration. However, the wireless device could access the cell, at the second location, based on the second access barring configuration.

According to some embodiments of the present disclosure, the wireless device may be in communication with at least one of a user equipment, a network, or an autonomous vehicle other than the wireless device.

Figure 11:
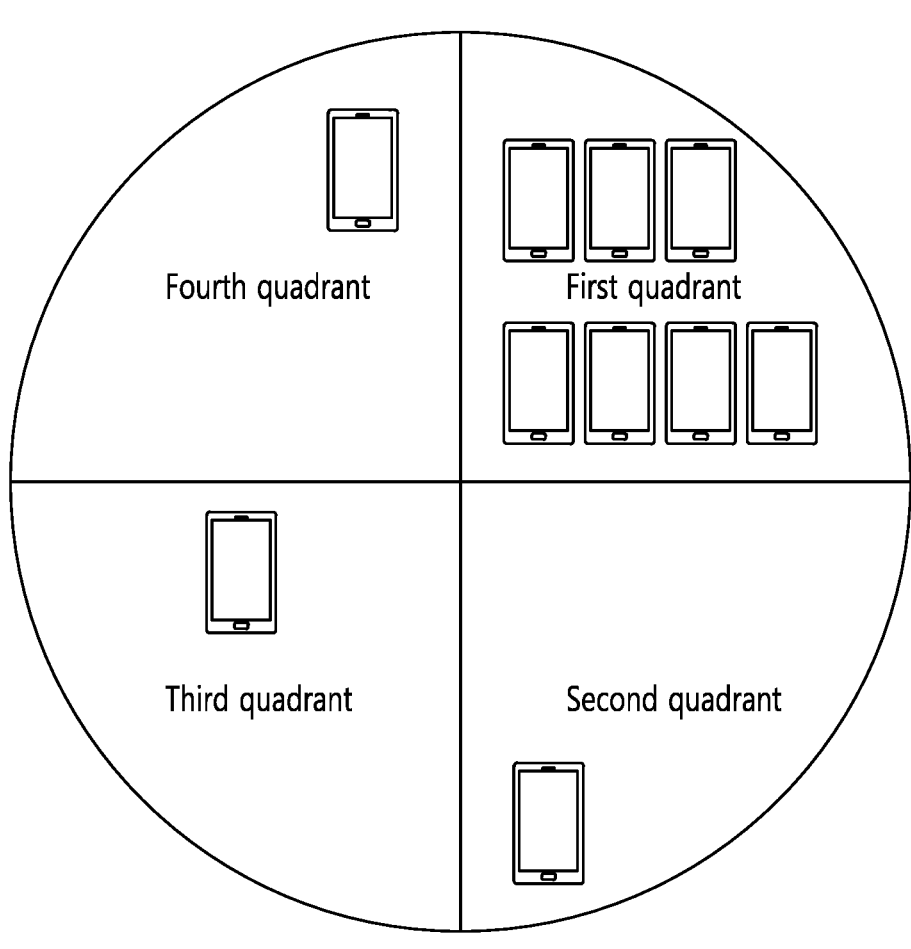
FIG. 11 shows an example of a method for acquiring a beam group specific system information in a wireless communication system, according to some embodiments of the present disclosure.

FIG. 11 shows an example of a method for acquiring a beam group specific system information in a wireless communication system, according to some embodiments of the present disclosure.

In FIG. 11, a cell could be divided by four quadrants. For example, there are seven UEs in the first quadrant. There is one UE in the second quadrant. There is one UE in the third quadrant. There is one UE in the fourth quadrant.

In other words, the UEs are concentrated in the first quadrant of the cell and only beams that cover the first quadrant are congested.

In such a case, different access barring configuration per quadrant would be very useful, for example, higher threshold for the first quadrant but lower threshold for other quadrants to reduce the number of access to the first quadrant.

For example, a cell could provide, to the UEs in the first quadrant, a first system information including higher threshold for access barring configuration. The cell could provide, to the UEs in the second, third, and fourth quadrants, a second system information including lower threshold for access barring configuration. The first system information may be different from the second system information.

Figure 12:
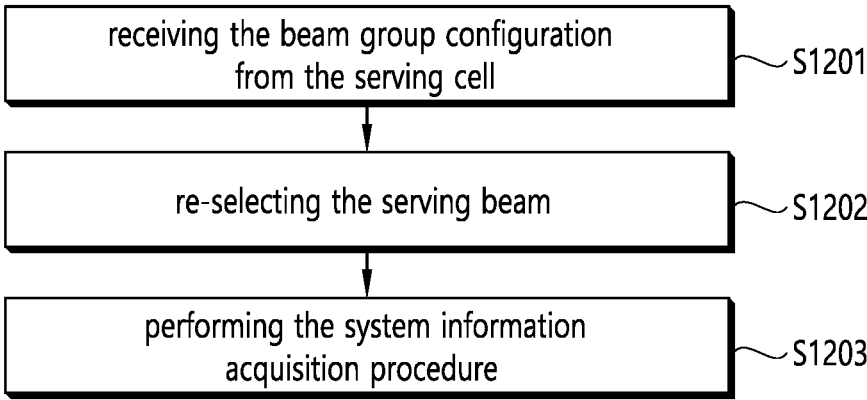
FIG. 12 shows an example of a method for acquiring a system information based on a beam group in a wireless communication system, according to some embodiments of the present disclosure.

FIG. 12 shows an example of a method for acquiring a system information based on a beam group in a wireless communication system, according to some embodiments of the present disclosure.

According to some embodiments of the present disclosure, a UE may decide whether to perform the system information acquisition based on the beam group that the serving beam belongs to.

For example, after serving beam changes, if the beam group that the serving beam belongs to is changed, UE may perform the system information acquisition procedure. The system information acquisition procedure may include the SI request procedure.

In step S1201, UE may receive the beam group configuration from the serving cell.

For example, the beam group configuration may indicate (and/or inform) which beam belongs to which beam group. UE may identify the beam based on the SS/PBCH block index and/or CSI-RS index. The following is an example of the beam group configuration:

Beam group #1: beam #1, beam #2 and beam #3
Beam group #2: beam #4, beam #5 and beam #6
Beam group #3: beam #7, beam #8 and beam #9

For example, the beam group configuration may be provided via SIB1. UE may acquire the beam group configuration by reading SIB1.

For example, the beam and beam group may be identified by the reference signal index, for example, SS/PBCH block index or CSI-RS index. That is, the beam identity may be SS/PBCH block index and/or CSI-RS index.

In step S1202, UE may re-select the serving beam.

For example, the serving beam may be used to monitor the system information and/or paging related information, for example, short message or paging message. UE may change the serving beam when the quality of the serving beam becomes lower than a threshold.

For example, when the serving beam is changed, UE may check whether the serving beam group is changed. The serving beam group may be a beam group that the current serving beam belongs to. UE may know the beam group that the serving beam belongs to, based on the beam group configuration.

In step S1203, UE may perform the system information acquisition procedure.

For example, when the serving beam group is changed, may initiate the system information acquisition. In other words, when the beam group that the (re-)selected beam belongs to is different from the beam group that the previous serving beam belongs to, UE may initiate the system information acquisition.

For example, the serving beam may be changed from beam #3 to beam #4. The beam #3 and #4 belong to beam group #1 and #2, respectively. That is, the beam #3 and #4 belong to different serving beam group. UE may consider the serving beam group is changed when the serving beam is change from #3 to beam #4. In this case, UE may perform the system information acquisition procedure.

For another example, the serving beam may be changed from beam #2 to beam #3. UE doesn't consider the serving beam group is changed, when the serving beam is change from beam #2 to beam #3, because these beams belong to the same beam group as shown in step S1201. Therefore, UE may not perform the system information acquisition procedure.

For example, upon initiation of the system information acquisition, the UE may read SIB1 and check the value tag in SIB1 for each SIB.

According to some embodiments of the present disclosure, if the value tag included in the received SIB1 for a SIB is identical to the value tag associated with the stored version of that SIB, UE may consider the stored SIB as valid within the current beam group.

According to some embodiments of the present disclosure, to acquire the system information, UE may perform the system information request procedure. For example, if the SIB that the UE wants to acquire is not broadcasting, UE may perform the system information request procedure.

According to some embodiments of the present disclosure, the system information may be either beam group specific system information and/or cell specific system information. The beam group specific system information is common within the beam group. The cell specific system information is common within the cell.

When the serving beam group is changed, UE may acquire the beam group specific system information only. For example, UE may not acquire the cell specific system information.

The following is an example of the beam group specific system information:

Beam group specific system information: SIB 9, SIB10, and SIB13.

For example, the beam group specific system information configuration may be provided via SIB1. UE may consider that other SIBs than the beam group specific system information are cell specific system information.

Hereinafter, an apparatus for acquiring a system information based on a beam group in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to select a first beam as a serving beam. The processor 102 may be configured to control the transceiver 106 to receive, from the first beam of a cell, a system information. The processor 102 may be configured to change the serving beam from the first beam to a second beam of the cell. The processor 102 may be configured to initiate a system information acquisition procedure for the system information based on determining that the second beam belongs to a different beam group from the first beam.

According to some embodiments of the present disclosure, the system information may include a cell specific system information and/or a beam group specific system information.

For example, the system information acquisition procedure may include receiving only the beam group specific system information.

For example, the system information acquisition procedure may include skipping to receive the cell specific system information.

According to some embodiments of the present disclosure, the processor 102 may be configured to control the transceiver 106 to receive, from the cell, a beam group configuration including a mapping information between beams and beam groups of the cell.

According to some embodiments of the present disclosure, the processor 102 may be configured to identify a beam group of the first beam and/or the second beam based on an index of a reference signal.

For example, the reference signal may include (1) synchronization signals (SS) and/or physical broadcast channel (PBCH block, and/or (2) Channel State Information Reference Signal (CSI-RS).

According to some embodiments of the present disclosure, the processor 102 may be configured to check whether the second beam belongs to a different beam group from the first beam, upon changing the serving beam from the first beam to a second beam of the cell.

According to some embodiments of the present disclosure, the system information acquisition procedure may include performing a system information request procedure, based on that a new system information to replace the system information received from the first beam is not broadcasted.

For example, the processor 102 may be configured to control the transceiver 106 to receive, from the second beam of the cell, the new system information in response to the system information request procedure.

According to some embodiments of the present disclosure, the system information acquisition procedure may include receiving, from the second beam, a System Information Block type 1 (SIB1) to receive a new system information to replace the system information received from the first beam, upon initiating the system information acquisition procedure.

For example, the system information acquisition procedure may include receiving the new system information, based on determining that the valued tag for the new system information included in the SIB 1 is different from the value tag associated with the system information received from the first beam.

For other example, the system information acquisition procedure may include skipping to receive the new system information, based on determining that the valued tag for the new system information included in the SIB1 is identical from the value tag associated with the system information received from the first beam.

According to some embodiments of the present disclosure, the cell may include a non-terrestrial network (NTN) cell.

According to some embodiments of the present disclosure, the processor 102 may be configured to be in communication with at least one of a user equipment, a network, or an autonomous vehicle other than the wireless device.

Hereinafter, a processor for a wireless device for acquiring a system information based on a beam group in a wireless communication system, according to some embodiments of the present disclosure, will be described.

The processor may be configured to control the wireless device to select a first beam as a serving beam. The processor may be configured to control the wireless device to receive, from the first beam of a cell, a system information. The processor may be configured to control the wireless device to change the serving beam from the first beam to a second beam of the cell. The processor may be configured to control the wireless device to initiate a system information acquisition procedure for the system information based on determining that the second beam belongs to a different beam group from the first beam.

According to some embodiments of the present disclosure, the system information may include a cell specific system information and/or a beam group specific system information.

For example, the system information acquisition procedure may include receiving only the beam group specific system information.

For example, the system information acquisition procedure may include skipping to receive the cell specific system information.

According to some embodiments of the present disclosure, the processor may be configured to control the wireless device to receive, from the cell, a beam group configuration including a mapping information between beams and beam groups of the cell.

According to some embodiments of the present disclosure, the processor may be configured to control the wireless device to identify a beam group of the first beam and/or the second beam based on an index of a reference signal.

For example, the reference signal may include (1) synchronization signals (SS) and/or physical broadcast channel (PBCH block, and/or (2) Channel State Information Reference Signal (CSI-RS).

According to some embodiments of the present disclosure, the processor may be configured to control the wireless device to check whether the second beam belongs to a different beam group from the first beam, upon changing the serving beam from the first beam to a second beam of the cell.

According to some embodiments of the present disclosure, the system information acquisition procedure may include performing a system information request procedure, based on that a new system information to replace the system information received from the first beam is not broadcasted.

For example, the processor may be configured to control the wireless device to receive, from the second beam of the cell, the new system information in response to the system information request procedure.

According to some embodiments of the present disclosure, the system information acquisition procedure may include receiving, from the second beam, a System Information Block type 1 (SIB1) to receive a new system information to replace the system information received from the first beam, upon initiating the system information acquisition procedure.

For example, the system information acquisition procedure may include receiving the new system information, based on determining that the valued tag for the new system information included in the SIB 1 is different from the value tag associated with the system information received from the first beam.

For other example, the system information acquisition procedure may include skipping to receive the new system information, based on determining that the valued tag for the new system information included in the SIB1 is identical from the value tag associated with the system information received from the first beam.

According to some embodiments of the present disclosure, the cell may include a non-terrestrial network (NTN) cell.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for acquiring a system information based on a beam group in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to select a first beam as a serving beam. The stored a plurality of instructions may cause the wireless device to receive, from the first beam of a cell, a system information. The stored a plurality of instructions may cause the wireless device to change the serving beam from the first beam to a second beam of the cell. The stored a plurality of instructions may cause the wireless device to initiate a system information acquisition procedure for the system information based on determining that the second beam belongs to a different beam group from the first beam.

According to some embodiments of the present disclosure, the system information may include a cell specific system information and/or a beam group specific system information.

For example, the system information acquisition procedure may include receiving only the beam group specific system information.

For example, the system information acquisition procedure may include skipping to receive the cell specific system information.

According to some embodiments of the present disclosure, the stored a plurality of instructions may cause the wireless device to receive, from the cell, a beam group configuration including a mapping information between beams and beam groups of the cell.

According to some embodiments of the present disclosure, the stored a plurality of instructions may cause the wireless device to identify a beam group of the first beam and/or the second beam based on an index of a reference signal.

For example, the reference signal may include (1) synchronization signals (SS) and/or physical broadcast channel (PBCH block, and/or (2) Channel State Information Reference Signal (CSI-RS).

According to some embodiments of the present disclosure, the stored a plurality of instructions may cause the wireless device to check whether the second beam belongs to a different beam group from the first beam, upon changing the serving beam from the first beam to a second beam of the cell.

According to some embodiments of the present disclosure, the system information acquisition procedure may include performing a system information request procedure, based on that a new system information to replace the system information received from the first beam is not broadcasted.

For example, the stored a plurality of instructions may cause the wireless device to receive, from the second beam of the cell, the new system information in response to the system information request procedure.

According to some embodiments of the present disclosure, the system information acquisition procedure may include receiving, from the second beam, a System Information Block type 1 (SIB1) to receive a new system information to replace the system information received from the first beam, upon initiating the system information acquisition procedure.

For example, the system information acquisition procedure may include receiving the new system information, based on determining that the valued tag for the new system information included in the SIB 1 is different from the value tag associated with the system information received from the first beam.

For other example, the system information acquisition procedure may include skipping to receive the new system information, based on determining that the valued tag for the new system information included in the SIB1 is identical from the value tag associated with the system information received from the first beam.

According to some embodiments of the present disclosure, the cell may include a non-terrestrial network (NTN) cell.

According to some embodiments of the present disclosure, the stored a plurality of instructions may cause the wireless device to be in communication with at least one of a user equipment, a network, or an autonomous vehicle other than the wireless device.

Hereinafter, a method performed by a base station (BS) for providing a system information based on a beam group in a wireless communication system, according to some embodiments of the present disclosure, will be described.

The BS may provide, via a first beam, a first system information. The BS may provide via a second beam, a second system information different from the first system information, based on that the second beam belongs to a different beam group from the first beam.

Hereinafter, a base station (BS) for providing a system information based on a beam group in a wireless communication system, according to some embodiments of the present disclosure, will be described.

The BS may include a transceiver, a memory, and a processor operatively coupled to the transceiver and the memory.

The processor may be configured to control the transceiver to provide, via a first beam, a first system information. The processor may be configured to control the transceiver to provide via a second beam, a second system information different from the first system information, based on that the second beam belongs to a different beam group from the first beam.

The present disclosure can have various advantageous effects.

According to some embodiments of the present disclosure, a wireless device could efficiently acquire a beam group specific a system information.

For example, a wireless device could apply the optimized system information depending on a location of the wireless device.

A wireless device could minimize the power consumption for acquiring the system information and requesting SI transmission by acquiring and requesting the system information based on the beam group.

According to some embodiments of the present disclosure, a wireless communication system could efficiently provide a beam group specific a system information to wireless devices in a single cell.

For example, a network could provide different system information to different wireless devices in IDLE state and/or INACTIVE state, which is optimized for the location of the wireless device.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, by a wireless device from a certain cell, a beam group configuration including mapping information between beams and beam groups used by the certain cell;

selecting, by the wireless device, a first beam as a serving beam of the certain cell;

identifying, by the wireless device, a first beam group of the first beam based on an index of a reference signal related to the first beam;

receiving, by the wireless device from the first beam of the certain cell, a first system information message including system information specific to the first beam group;

changing, by the wireless device, the serving beam from the first beam to a second beam while camping on the certain cell;

identifying, by the wireless device, a second beam group of the second beam based on an index of a reference signal related to the second beam;

determining, by the wireless device, whether the first beam group is different from the second beam group; and based on determining that the first beam group is not the same as the second beam group:

initiating, by the wireless device, a system information acquisition procedure for the system information specific to the second beam group, while camping on the certain cell;

transmitting, by the wireless device to the certain cell, a system information request message for the system information specific to the second beam group; and receiving, by the wireless device from the certain cell, a second system information message including system information specific to the second beam group.

2. The method of claim 1, wherein the reference signal includes (1) synchronization signals (SS) and/or physical broadcast channel (PBCH block, and/or (2) Channel State Information Reference Signal (CSI-RS).

3. The method of claim 1, wherein the wireless device is in communication with at least one of a user equipment, a network, or an autonomous vehicle other than the wireless device.

4. A wireless device comprising:

a transceiver;

a memory; and at least one processor operatively coupled to the transceiver and the memory, and adapted to perform operations, the operations comprising:

receiving, from a certain cell, a beam group configuration including mapping information between beams and beam groups used by the certain cell;

selecting a first beam as a serving beam of the certain cell;

identifying a first beam group of the first beam based on an index of a reference signal related to the first beam;

receiving, from the first beam of the certain cell, a first system information message including system information specific to the first beam group;

changing the serving beam from the first beam to a second beam while camping on the certain cell;

identifying a second beam group of the second beam based on an index of a reference signal related to the second beam;

determining whether the first beam group is different from the second beam group; and based on determining that the first beam group is not the same as the second beam group:

initiating a system information acquisition procedure for the system information specific to the second beam group, while camping on the certain cell;

transmitting, to the certain cell, a system information request message for the system information specific to the second beam group; and receiving, from the certain cell, a second system information message including system information specific to the second beam group.

5. A non-transitory computer-readable medium having stored thereon a plurality of instructions, which, when executed by a processor of a wireless device, cause the wireless device to perform operations, the operations comprising:

receiving, from a certain cell, a beam group configuration including mapping information between beams and beam groups used by the certain cell;

selecting a first beam as a serving beam of the certain cell;

identifying a first beam group of the first beam based on an index of a reference signal related to the first beam;

receiving, from the first beam of the certain cell, a first system information message including system information specific to the first beam group;

changing the serving beam from the first beam to a second beam while camping on the certain cell;

identifying a second beam group of the second beam based on an index of a reference signal related to the second beam;

determining whether the first beam group is different from the second beam group; and based on determining that the first beam group is not the same as the second beam group:

initiating a system information acquisition procedure for the system information specific to the second beam group, while camping on the certain cell;

transmitting, to the certain cell, a system information request message for the system information specific to the second beam group; and receiving, from the certain cell, a second system information message including system information specific to the second beam group.

* * * * *